Feb. 16, 1965   S. A. WRIGHT   3,169,596
STEP TRAVERSING VEHICLES
Filed Dec. 19, 1962   3 Sheets-Sheet 1
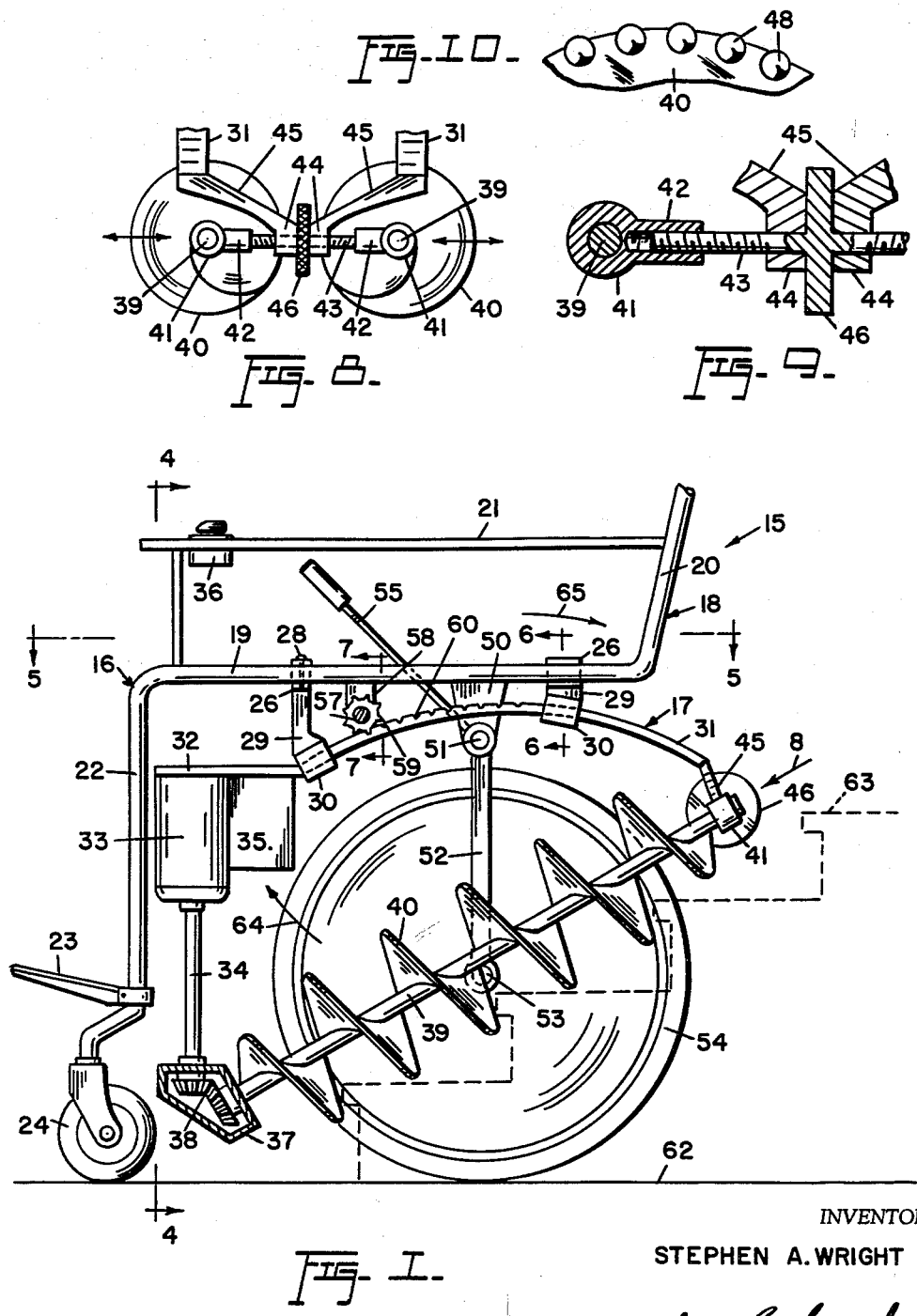
INVENTOR
STEPHEN A. WRIGHT
BY Jerry B. Cesak

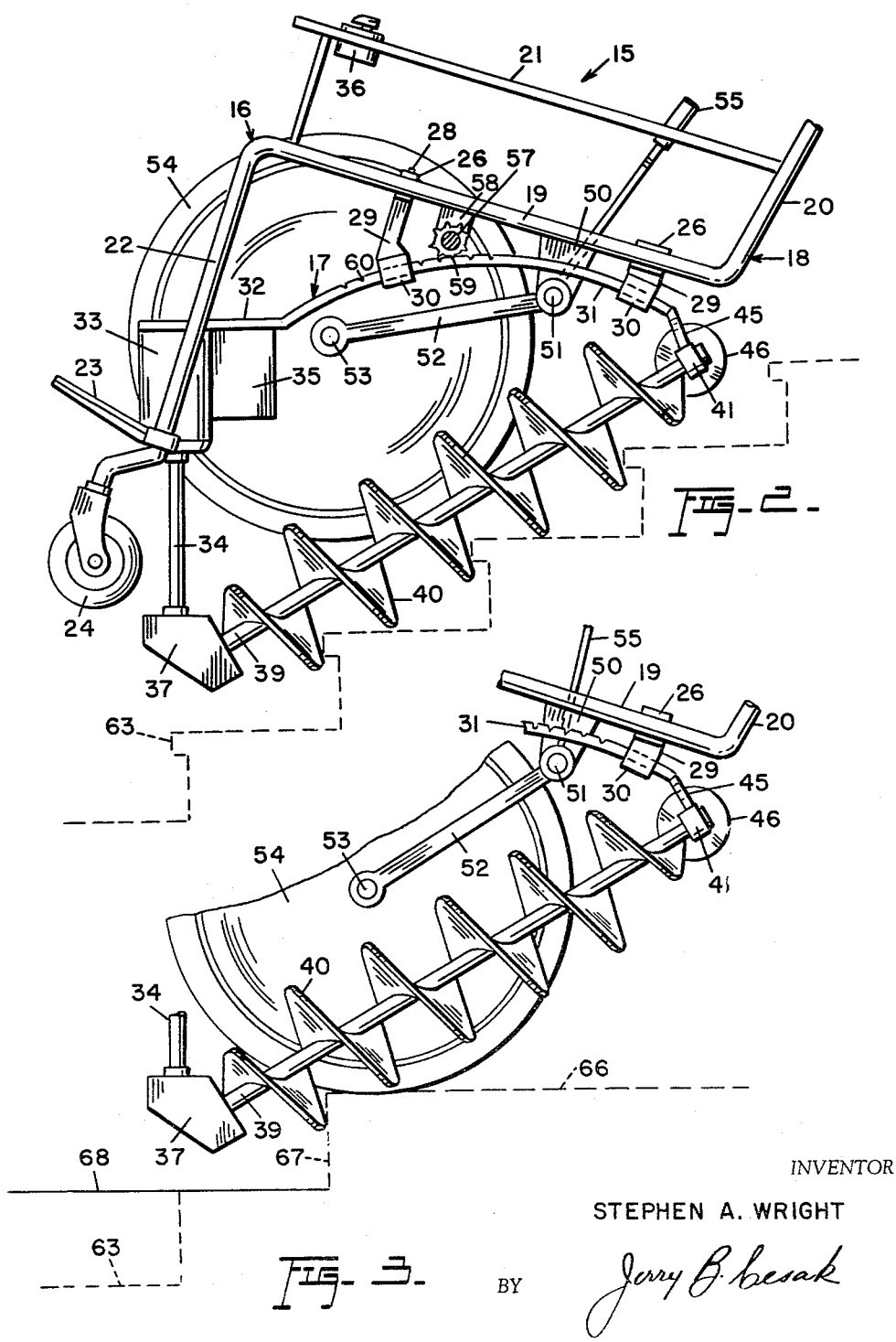

Feb. 16, 1965    S. A. WRIGHT    3,169,596
STEP TRAVERSING VEHICLES
Filed Dec. 19, 1962    3 Sheets-Sheet 3
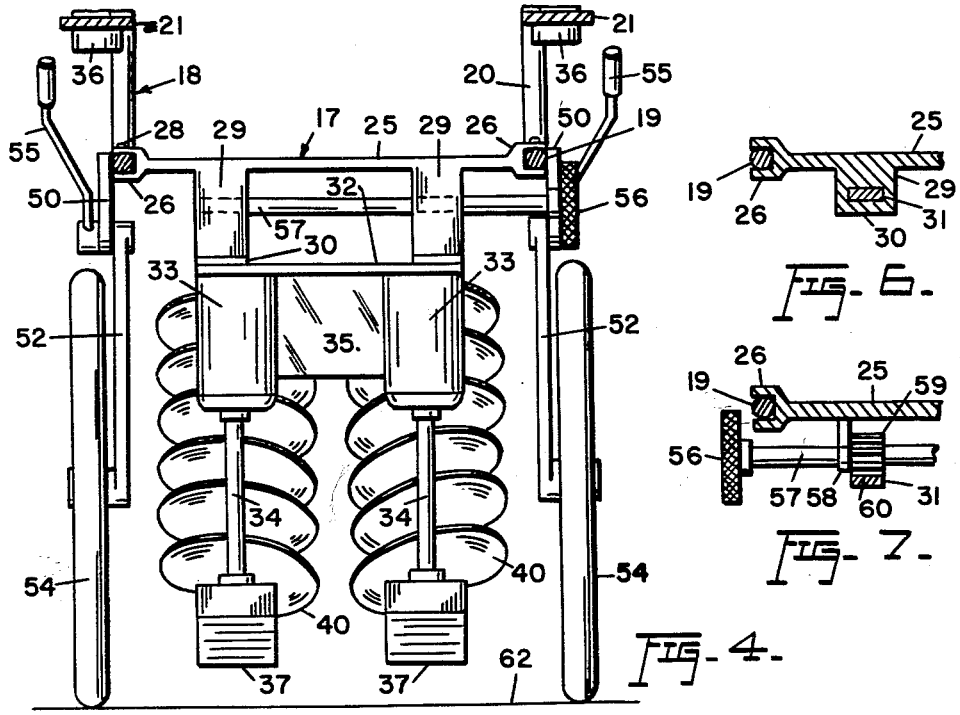
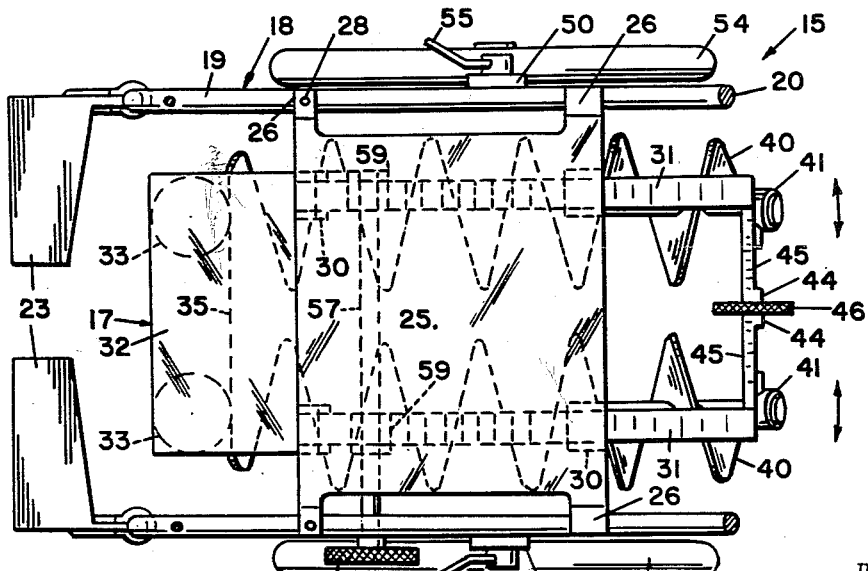
INVENTOR
STEPHEN A. WRIGHT
BY
Jerry B. Besak

United States Patent Office 3,169,596
Patented Feb. 16, 1965

3,169,596
STEP TRAVERSING VEHICLES
Stephen A. Wright, P.O. Box 182, Joshua Tree, Calif.
Filed Dec. 19, 1962, Ser. No. 245,723
12 Claims. (Cl. 180—7)

This invention relates to new and useful improvements in step traversing vehicles, and the principal object of the invention is to provide a vehicle which is capable of climbing and descending steps, stairs, curbs, low platforms, or the like.

As such, the invention is primarily concerned with vehicles of the wheel chair type, wherein the step or stair climbing and descending ability of the invention is highly desirable in order to permit the occupant to travel from one level to another as well as from place to place on the same level, without confinement to the same level which is inherent in occupant-propelled wheel chairs of conventional types. However, the use of the invention is not limited to wheel chairs, since the invention is also applicable to hand-pushed carts, shopping baskets and other wheeled conveyances of this general nature.

With specific regard to wheel chairs, several attempts have been made in the past to equip them with step or their traversing means, but for most part, such attempts have resulted in complex mechanical arrangements with attendant difficulties of operation. Also, such arrangements were bulky and in many instances they interfered with folding of the chair for purposes of transportation in an automobile, or the like, which is highly desirable if not necessary. In addition, many conventional arrangements failed to provide a positive engagement with the steps or stairs, and thus left the occupant of the chair in an insecure position which, from the standpoint of psychological reaction as well as possible injury, has to be avoided.

The present invention eliminates these various disadvantages by providing the wheel chair with a compact, simply constructed mechanism for traversing steps or stairs in a dependable, easily controlled manner. As such, the step traversing means of the invention may be readily detached from the chair proper, so that the latter may be folded in the usual manner for transportation purposes. The step traversing means are light in weight and may be manufactured at low cost.

Other objects and features of the invention will become apparent from the following description taken in conjunction with the accompanying drawings, wherein like characters of reference are employed to designate like parts, and wherein:

FIGURE 1 is a side elevational view of the step traversing wheel chair in accordance with the invention, with the invention, with the near wheel removed and some parts shown in section and with the chair resting on an even surface;

FIGURE 2 is a view, similar to that in FIGURE 1, but showing the chair in its stair traversing position;

FIGURE 3 is a fragmentary view, similar to FIGURES 1 and 2, but showing the chair in position for descending stairs or a step or curb;

FIGURE 4 is a vertical cross-sectional view, taken substantially in the plane of the line 4—4 in FIGURE 1;

FIGURE 5 is a horizontal sectional view, taken substantially in the plane of the line 5—5 in FIGURE 1;

FIGURE 6 is a fragmentary sectional detail, taken substantially in the plane of the line 6—6 in FIGURE 1;

FIGURE 7 is a fragmentary sectional detail, taken substantially in the plane of the line 7—7 in FIGURE 1;

FIGURE 8 is a fragmentary end view, taken in the direction of the arrow 8 in FIGURE 1;

FIGURE 9 is an enlarged, fragmentary sectional detail of the screw adjusting means; and FIGURE 10 is a fragmentary, enlarged elevational detail of the peripheral portion of one of the screws.

Referring now to the accompanying drawings in detail, the step traversing vehicle in accordance with the invention is designated generally by the reference numeral 15 and, in the instance shown, assumes the form of a wheel chair, although it is to be understood that the teachings of the invention are also applicable to wheeled carts, shopping baskets, and the like, as already mentioned.

The wheel chair type vehicle 15 embodies in its construction a chassis which is generally indicated by the numeral 16 and consists of two principal components, namely, a lower framework or undercarriage 17 and a superstructure 18. For sake of simplicity, the superstructure 18, which may be regarded as the wheel chair proper, has not been shown with the usual seat and backrest pads or cushions, but it will be observed that it includes the seat portion 19, the backrest portion 20, arm rests 21, a depending front portion 22, foot rests 23 and casters 24. The chair proper may be foldable for purposes of transportation in a manner which is well known in the art and consequently, a disclosure thereof herein is unnecessary.

The entire undercarriage or framework 17 is separably connected to the superstructure 18, this being attained in any suitable manner, such as for example, by providing the undercarriage with a top plate 25 which extends across the seat portion 19 and is equipped at its opposite side edges with open sockets 26 to removably receive the side rails of the seat portion, as shown in FIGURES 4-7. In the conventional folding arrangement of the chair, the side rails of the seat portion 19 may be drawn apart or brought toward each other, which facilitates insertion and removal of the top plate 25 with its sockets 26 between the side rails. Suitable keeper pins 28 may be provided in some of the sockets to engage the side rails of the seat portion and thus prevent the plate 25 from sliding longitudinally of the side rails.

Depending support brackets 29 project from the underside of the top plate 25 and carry pairs of slotted eyes 30 which are slidable longitudinally along a pair of spaced parallel, arcuate guides 31. The latter, together with the brackets 29 and eyes 30, also form constituents of the undercarriage 17, as does a frontal plate 32 to which forward ends of the guides 31 are secured. The plate 32 is substantially horizontal and has attached to the underside thereof a pair of transversely spaced electric motors 33 having downwardly projecting armatures 34. The motors 33 derive their source of current from a suitable battery in a battery box 35 which is also attached to the underside of the plate 32, and individual rheostat switches 36 are provided on the two arm rests 21 whereby the two motor may be energized, de-energized, reversed and individually controlled as to speed of rotation.

The lower end portion of the armature or drive shaft 34 of each motor 33 extends into a gear box 37 where it is operatively connected by bevel gearing 38 to the shaft 39 of a propulsion screw 40. Two such screws 40 are employed, being disposed in transversely spaced, substantially parallel relation below the framework 17, but in an inclined plane which is compatible with the rise of the steps or stairs to be traversed. The lower or forward ends of the screw shafts 39 are rotatably journalled in the respective gear boxes 37, while their upper or rear ends are journalled in suitable bearings 41 which are adjustably connected to the rear ends of the guides 31, as will be hereinafter described.

As is best shown in FIGURES 8 and 9, the bearings 41 are provided with laterally projecting bosses 42 which are internally threaded with screw-threads of opposite hands and receive therein oppositely screw-threaded end portions of a rod 43. The intermediate portion of the rod 43 is freely rotatable in a pair of spaced apertured ears 44 provided on arms 45 which extend downwardly and inwardly from the rear ends of the guides 31. An adjusting wheel 46 is rigid with or secured to the center portion of the rod 43 between the ears 44, so that by simply rotating this wheel, the rear ends of the screw shafts 39 may be drawn together or apart, thus correspondingly varying the spacing between the rear end portions of the screws 40 so that the screws may be selectively parallel, rearwardly convergent or rearwardly divergent. During this adjustment of the screws 40 with the associated shafts 39, the gear boxes 37 simply pivot about the axes of the motor shafts 34, and sufficient slackness exists between the parts 39, 41 and 42, 43 to make such an adjustment possible.

It may be noted at this point that the two screws 40 are pitched in opposite directions and are counter-rotating, that is, driven in opposite directions to produce a uni-directional thrust, either forwardly or rearwardly, as the case may be. As is detailed in FIGURE 10, the peripheries of the screws 40 are preferably provided with a plurality of rotatable elements 48 which project outwardly from the screw peripheries to engage the steps or stairs and prevent possible damage thereof by the screws themselves.

Referring again to the undercarriage 17 and superstructure 18, it will be observed that the side rails of the superstructure seat portion 19 carry a pair of depending brackets 50 which have pivoted thereto as at 51 a pair of arms 52. The lower ends of these arms are equipped with stub axles 53 on which the main traveling wheels 54 of the chair are rotatably mounted, so that by virtue of the arms 52, the wheels 54 may be raised and lowered between retracted and projected positions, respectively. Suitable hand levers 55 are secured to the pivots 51 of the levers 52 for raising and lowering of the wheels, and any suitable locking means (not shown) may be used to lock the wheels in the desired position.

The superstructure 18 together with the top plate 25 of the framework 17 is shiftable longitudinally along the guides 31 by virtue of the slidable positioning of the eyes 30 on the guides. The shifting of the superstructure is effected by a hand wheel 56 which is secured to a cross shaft 57 journalled in suitable bearings 58 on the underside of the top plate 25, the shaft 57 also carrying a pair of pinions 59 which operatively engage toothed rack portions 60 formed in the guides 31. Any suitable means (not shown) may be used to lock the shaft 57 against rotation when the superstructure 18 has been adjusted to the desired position relative to the guides.

With the construction of the invention thus described, its manner of operation will now be explained.

Referring first to FIGURE 1, it will be noted that when the chair is resting on an even surface 62 such as a floor, or the like, the wheels 54 are lowered so that the chair may be rolled along the floor on the wheels 54 and casters 24 in the usual manner while the screws 40 are in a raised position above the floor by virtue of the lowered wheels. In this position, the superstructure 18 is slid forwardly on the guides 31 so that the seat portion 19 thereof is substantially horizontal.

When it is desired to ascend a flight of stairs, indicated by the dotted lines 63 in FIGURES 1 and 2, the chair is first backed up against the stairs and the wheels 54 are retracted in the direction of the arrow 64 in FIGURE 1, so as to permit the screws 40 to operatively engage the stairs in the ultimate retracted position of the wheels as illustrated in FIGURE 2. In so doing, the wheels 54 are retracted gradually from the fully projected position of FIGURE 1 to the fully retracted position of FIGURE 2, thus enabling the screws 40 to engage the stairs without interference of the wheels with the steps at the bottom of the stairs, and it will be noted in this regard that the screws 40 are long enough to span at least two or three steps and thereby make engagement of the screws with the steps possible even when the wheels 54 are not fully retracted. As soon as engagement of the screws with the steps takes place, the hand wheel 56 is manipulated to slide the superstructure 18 rearwardly on the guides 31 as indicated by the arrow 65 in FIGURE 1, whereby the superstructure assumes a rearwardly tilted position as shown in FIGURE 2, with a rearward shift of the center of gravity of the chair as a whole, which prevents the chair from tipping forwardly while traversing the stairs. The motors 33 are then energized and as rotation is imparted to the screws 40, the screws progressively engage the successive steps and cause the entire chair to climb the stairs. When the chair reaches a position near the top of the stairs, the wheels 54 are lowered to maintain them in contact with the level 66 as shown in FIGURE 3. The superstructure is shifted forwardly on the guides 31 and as the screws 40 clear the uppermost step, the wheels 54 reach their fully lowered position so that they as well as the casters 24 support the chair in a travelling position on the level 66.

The above outlined operation is reversed when it is desired to descend the stairs, as is also represented by FIGURES 3 and 2, it being understood, of course, that the screws 40 rotate in opposite directions while descending, as compared to ascending. FIGURE 3 also shows how the device may be used to ascend or descend a single step 67 such as a curb, for example, between the levels 66 and 68.

If for some reason it is necessary for the chair to negotiate corners during the stair traversing operation, the rheostat controls 36 are adjusted to rotate one of the screws 40 faster or slower than the other, depending on the direction of the turn.

The screws 40 can operate quite effectively while their shafts 39 are parallel, but the adjusting means 42, 43, 46 may be used to vary the spacing of the rear end portions of the screws so that they are parallel, or rearwardly divergent, or rearwardly convergent. The rearwardly convergent relationship of the screws is desirable when the chair is ascending stairs, inasmuch as it introduces a slip angle which causes the screws to pull the chair rearwardly toward or against the stairs. Conversely, when the screws are rotated reversely to descend the stairs, the rearwardly divergent (or forwardly convergent) relationship of the screws is desirable to introduce the slip angle which again pulls the chair against the stairs.

It will be understood, of course, that the screws are of a suitable pitch to operate satisfactorily on stairs of various sizes, and it will be also noted that the ends of the screws are somewhat tapered to facilitate their engagement with the steps when the chair is first brought to a stair traversing position. It is also significant to note that although the step traversing action is brought about by rotation of the screws, the screws themselves cannot be rotated merely as a result of a tendency of the chair to slide downwardly along the stairs. In other words, rotation of the screws can be effected only by energizing the motors 33, and if for some reason the motor drive to the screws should become inoperative while the chair is in a stair traversing position, the screws will automatically lock with the steps and positively prevent any falling or slipping of the chair.

When the chair is to be folded for transportation in an automobile, or the like, the pins 28 are withdrawn and the entire undercarriage 17, including the plate 25, the guides 31, the screws 40 and the motors 33, is removed from the superstructure 18 and the latter is folded in the conventional manner.

While in the foregoing there has been shown and described the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. In a step traversing wheel chair, the combination of a chassis, wheels provided on said chassis for traveling over even surfaces, a rotatable screw disposed in a rearwardly inclined position and connected to said chassis for propelling the same over steps, means for rotating said screw, and means for raising and lowering said wheels relative to said screw.

2. In a step traversing wheel chair, the combination of a chassis, projectable and retractable wheels provided on said chassis for traveling over even surfaces when said wheels are projected, a pair of transversely spaced rotatable screws disposed in a rearwardly inclined position and connected to said chassis for propelling the same over steps, means for rotating said screws, and means for raising and lowering said wheels whereby said screws may assume a step engaging position when the wheels are retracted.

3. The device as defined in claim 2 together with means for varying the spacing of said screws at one end thereof.

4. The device as defined in claim 2 wherein said screws have peripheries, and rotatable step engaging elements provided at the peripheries of said screws.

5. The device as defined in claim 2 wherein said chassis includes a lower framework carrying said screws, a superstructure having said wheels connected thereto, and means separably attaching said superstructure to said framework.

6. The device as defined in claim 5 together with means for adjusting the position of said superstructure forwardly and rearwardly on said framework, whereby to shift the center of gravity of the wheel chair.

7. A step traversing vehicle, comprising in combination a chassis including a lower framework and a superstructure thereon, projectable and retractable wheels connected to said superstructure for traveling over even surfaces when said wheels are projected, means for projecting and retracting said wheels, a pair of transversely spaced rotatable screws mounted in a substantially parallel but inclined position under said framework for propelling the vehicle over steps, power driven means supported by said framework and operatively connected to said screws for rotating the same, said screws assuming a step engaging position when said wheels are retracted, and means for adjustably mounting said superstructure on said framework, whereby the center of gravity of the vehicle may be shifted in a plane substantially parallel to said screws.

8. The vehicle as defined in claim 7 together with means for varying the spacing of said screws at one end thereof.

9. The vehicle as defined in claim 7 wherein said screws have peripheries, and rotatable step engaging elements provided at the peripheries of said screws.

10. In a step traversing wheel chair, the combination of a framework having a front and rear, a pair of transversely spaced rotatable screws mounted in a substantially parallel but rearwardly inclined position under said framework, the angle of inclination of said screws relative to the framework being fixed, power driven means for rotating said screws, projectable and retractable traveling wheels, and means connecting said wheels to said framework for raising and lowering movement of the wheels relative to the fixed angular inclination of said screws.

11. The device as defined in claim 10 together with transversely spaced pivot means connecting said screws at one end thereof to said framework for pivotal movement of the screws in the plane of their inclination, said pivot means being spaced apart by a fixed distance, and adjusting means provided at the other end of said screws for moving the same toward and away from each other.

12. The device as defined in claim 10 together with a superstructure mounted on said framework, and means for moving said superstructure forwardly and rearwardly relative to the framework whereby to correspondingly shift the center of gravity of the wheel chair.

References Cited in the file of this patent

UNITED STATES PATENTS

| | Fitzpatrick | Nov. 23, 1835 |
|---|---|---|
| 1,087,372 | Hoines | Feb. 17, 1914 |
| 2,751,027 | McLaughlin | June 19, 1956 |

FOREIGN PATENTS

| 541,551 | Great Britain | Dec. 2, 1941 |
|---|---|---|

OTHER REFERENCES

Brochure—Wanted a Stair Climbing Wheel Chair, January 1962, National Inventors Council, Wash. D.C.